United States Patent [19]

Sato

[11] Patent Number: 4,946,991

[45] Date of Patent: Aug. 7, 1990

[54] TRANSHEXAHYDROTEREPHTHALIC ACID ESTER DERIVATIVES

[76] Inventor: Hisato Sato, 3-23, Tabata, Kita-ku, Tokyo, Japan

[21] Appl. No.: 44,740

[22] Filed: May 1, 1987

[30] Foreign Application Priority Data

Jun. 10, 1986 [JP] Japan .................. 61-134457

[51] Int. Cl.$^5$ ............................ C07C 69/74
[52] U.S. Cl. ................... 560/127; 252/299.01
[58] Field of Search ......................... 560/127

[56] References Cited

PUBLICATIONS

Nguyen Huu Tinh, Mol. Cryst. Liq. Cryst, 1985 vol. 127, pp. 143-151.
Verbit, L. et al., Mol, Cryst. Liq. Cryst. 1975 vol. 30. pp 201-207.
Cox, R. J., Chemical Abstracts, vol. 94:23244n, 1981.
Tinh, Chemical Abstracts, vol. 103:62971w, 1985.
Verbit, L., Chemical Abstracts, vol. 86:180987j, (1977).
M. E. Neubert et al., "Synthesis and Mesomorphic Properties of the Homologous Series of Di(4'-Alkylphenyl)Trans-Cyclohexane-1, 4-Dicarboxylates", p. 585 Column 1,2, Abstract No. 25 872x, Chemical Abstracts, vol. 98, No. 4, 1/24/83.
M. E. Neubert et al., "Synthesis and Mesomorphic Properties of the Homologous Series of Trans-1, 4-Cyclohexane Bis (4-N-Alkoxybenzenes)", pg. 655, column 2, Abstract No. 22 180k, Chemical Abstracts, vol. 92, No. 3, Jan. 21, 1980.
D. Demus in "Nonemissive Electrooptic Displays", A. R. Kmetz and F. K. Von Willisen, Eds. Plenum Press, pp. 83-119 (1969).

*Primary Examiner*—Paul J. Killos
*Attorney, Agent, or Firm*—Oblon, Spivak, McClelland, Maier & Neustadt

[57] ABSTRACT

Novel transhexahydroterephthalic acid ester derivatives represented by the general formula (I):

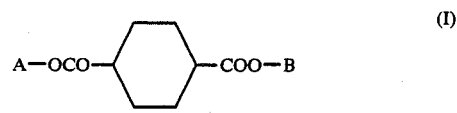

are usable as a liquid crystal or an additive to liquid crystal compositions.

The compound (I) can lower the melting point and raise the clear point of a liquid crystal composition, thus the liquid crystal range of the composition would broaden.

2 Claims, No Drawings

TRANSHEXAHYDROTEREPHTHALIC ACID ESTER DERIVATIVES

BACKGROUND OF THE INVENTION (1.) Field of the Invention

This invention relates to transhexahydroterephthalic acid ester derivatives, and more particularly to transhexahydroterephthalic acid ester derivatives usable as liquid crystals and as an additive to liquid crystal compositions.

(2.) Description of the Prior Art

Nematic liquid crystal substances are widely utilized as electro-optical display elements and the like for their characteristics of changing the optical properties markedly under the influence of an electric field.

In order to actually utilize these substances for an industrial purpose, they should meet several requirements which include: colorless and transparent properties; electrical, optical and chemical stability; wide liquid crystal range desirably from −5° C. to +65° C.; and low viscosity desirably lower than 50 cp.

Although great many liquid crystal substances have been known to date, none of them can satisfy the above-mentioned requirements as a single substance. Therefore, it has been the conventional practice to use for liquid crystal display elements a composition containing two or three or more liquid crystal substances.

In order to impart satisfactory contrast on application of a given voltage, the liquid crystal is required to have predetermined dielectric anisotropy. However, in a case where a conventional high temperature liquid crystal is added to a liquid crystal composition for the purpose of broadening its liquid crystal range, difficulties are encountered in that the properties of the liquid crystal composition are deteriorated by an increase of viscosity or degradation of dielectric anisotropy.

SUMMARY OF THE INVENTION

Under these circumstances, the present inventor has conducted an extensive research for a liquid crystal substance which would broaden the liquid crystal range when blended into a liquid crystal composition, and as a result has found that it is possible to lower the melting point and raise the clear point by a transhexahydroterephthalic acid ester derivative represented by the following formula (I)

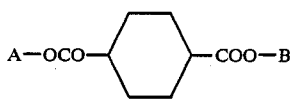
(I)

wherein A is a group of

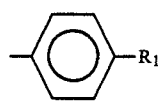

in which $R_1$ denotes an alkyl group having 1 to 6 carbon atoms or an alkoxy group having 1 to 6 carbon atoms, or a group of

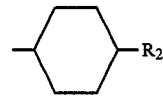

in which $R_2$ is the same as $R_1$, B is a group of

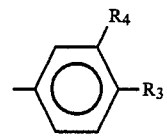

in which $R_3$ denotes a halogen atom, a cyano group, an alkyl group having 1 to 6 carbon atoms or an alkoxy group having 1 to 6 carbon atoms, and $R_4$ denotes a hydrogen atom or a halogen atom, or a group of

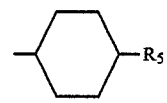

in which $R_5$ denotes an alkyl group having 1 to 6 carbon atoms, except for a case where $R_1$ and $R_3$ are concurrently alkyl or alkoxy groups having the same number of carbon atoms and $R_4$ is a hydrogen atom.

Further, it has been found that, among the compounds (I), the compounds represented by the following formula (I') have the above-mentioned effects while lowering the threshold value (Vth) of the liquid crystal composition.

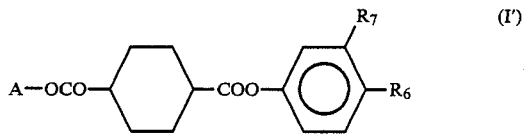
(I')

wherein $R_6$ is a halogen atom or a cyano group, $R_7$ is a hydrogen atom, a halogen atom or a cyano group, and A has the same meaning as defined hereinbefore.

The present invention is based on the above-described findings, and has its object the provision of transhexahydroterephthalic acid ester derivatives, which can be blended to obtain a liquid crystal composition with a broad liquid crystal range along with excellent properties.

DETAILED DESCRIPTION OF THE INVENTION AND PREFERRED EMBODIMENTS

The transhexahydroterephthalic acid ester derivatives according to the present invention can be prepared by a known process, reacting a transhexahydroterephthalic acid or its derivative with a substituted phenol and/or a substituted cyclohexenol successively or concurrently.

Examples of transhexahydroterephthalic acid derivatives include acid halides, activated esters and the like. The solvent to be used for the reaction may be an organic solvent such as toluene, benzene, ether and the like.

When the group A and/or the group B in the transhexahydroterephthalic acid ester derivatives according to the invention is a substituted cyclohexyl group, it is preferred to be of a trans-form.

Although the transhexahydroterephthalic acid ester of the invention is a liquid crystal by itself, it is preferred to use it as a liquid crystal composition containing other liquid crystal substance or substances.

When added to a liquid crystal composition, the compound (I) according to the invention can lower the melting point and raise the clear point of the composition. Especially, the compound (I') according to the invention is further capable of lowering the threshold value, Vth, of the composition. Accordingly, the compound of the invention is usable for broadening the liquid crystal range.

Now, the invention is illustrated more particularly by the following examples.

EXAMPLE 1

Synthesis of transhexahydroterephthalic acid 4-n-propylphenyl-4'-fluorophenyldiester:

(i) After adding 10 g of transhexahydroterephthalic acid dichloride to 50 ml of toluene, a mixture of 4.2 g of pyridine and 6.5 g of n-propylphenol was dropped thereinto over a time period of 40 minutes at 100° C. while stirring. Further, a solution of 4.2 g of pyridine in 10 g of water was carefully added thereto, and, after cooling down to 20° C., the resulting mixture was filtered and the mother liquor was extracted with sodium bicarbonate water. The extract was acidified by addition of hydrochloric acid, followed by filtration of the precipitate and recrystallization with toluene to obtain 3.3 g of hexahydroterephthalic acid 4-n-propylmonoester.

(ii) The monoester obtained in (i) was formed into acid chloride by ordinary procedures, and recrystalized (3.3 g) in ether. 3 g of this acid chloride was added to 15 ml of toluene containing 0.8 g of pyridine and 1.1 g of 4-fluorophenol, while stirring for 1 hour at 100° C. for reaction. After cooling, the reaction product was washed with dilute hydrochloric acid, and then washed with water until the wash liquid became neutral, and dried with sodium sulfuric anhydride. After distilling out toluene, the residue was recrystalized in alcohol for two times and then dried to obtain 3.2 g of hexahydroterephthalic acid 4-n-propylphenyl-4'-fluorophenyldiester.

Mesomatic range (M.R.) 83.5°→150.9° C.

EXAMPLE 2

The following compounds were obtained in the same manner as in Example 1, using a substituted phenol or a substituted transcyclohexanol corresponding to transhexahydroterephthalic acid chloride.

(1) Hexahydroterephthalic acid 4-n-propylphenyl-3',4'-difluorophenyldiester
M.R. 72.8°→113.2° C.

(2) Hexahydroterephthalic acid 4-n-propylphenyl-4'-cyanophenyldiester
M.R. 102.8°→212.5° C.

(3) Hexahydroterephthalic acid 4-n-propylphenyl-3'-fluoro-4'-cyanophenyldiester
M.R. 82.2°→172.5° C.

(4) Hexahydroterephthalic acid 4-n-butylphenyl-4'-fluorophenyldiester
M.R. 77.2°→138.1° C.

(5) Hexahydroterephthalic acid 4-n-butylphenyl-3',4'-difluorophenyldiester
M.R. 62.2°→99.5° C.

(6) Hexahydroterephthalic acid 4-n-butylphenyl-4'-cyanophenyldiester
M.R. 92.1°→190.1° C.

(7) Hexahydroterephthalic acid 4-n-butylphenyl-3'-fluoro-4'-cyanophenyldiester
M.R. 95.4°→155.4° C.

(8) Hexahydroterephthalic acid 4-n-propylphenyl-4'-hexylphenyldiester
M.R. 75.8°(crystal)→117.5°(S)→153.1(N)° C.

(9) Hexahydroterephthalic acid 4-n-propylcyclohexyl-4'-fluorophenyldiester
M.R. 98.6°→138.9° C.

(10) Hexahydroterephthalic acid 4-n-propylphenyl-4'-n-butylphenyldiester
M.R. 93.4°→160.8° C.

(11) Hexahydroterephthalic acid 4-n-propylphenyl-4'-methoxyphenyldiester
M.R 102.3°→203.8° C.

(12) Hexahydroterephthalic acid 4-n-propylcyclohexyldiester
M.R. 131.9°→161.2° C.

(13) Hexahydroterephthalic acid 4-n-propylphenyl-4'-propylcyclohexyldiester
M.R. 94.6°→154.7° C.

(14) Hexahydroterephthalic acid 4-n-butylphenyl-4'-methylphenyldiester
M.R. 82.6°→164.8° C.

(15) Hexahydroterephthalic acid 4-n-butylphenyl-4'-chlorophenyldiester
M.R. 88.4°→164.8° C.

EXAMPLE 3

The following liquid crystal compositions were prepared, followed by measurement of N→I temperature and Vth. The results are shown in Table 1.

Compositions:

Basic Composition A

A mixture of equivalent amounts of 4-n-propylcyclohexanecarboxylic acid 4'-ethoxyphenylester, 4-n-butylcyclohexanecarboxylic acid 4'-ethoxyphenyl ester and 4-n-pentylcyclohexanecarboxylic acid 4-methoxyphenyl ester.

Basic Composition B (comparative composition)

50 parts of Basic Composition A, 9 parts of n-propylcyclohexanecarboxylic acid 4'-cyanophenyl ester, 8 parts of n-butylcyclohexanecarboxylic acid 4'-cyanophenyl ester, 8 parts of 4-n-pentylcyclohexanecarboxylic acid 4'-cyanophenyl ester, and 5 parts of 4-propylbenzoic acid 4'-cyanophenyl ester.

Inventive Composition 1

92 parts of Basic Composition B, 4 parts of hexahydroterephthalic acid 4-n-propylphenyl-4'-fluorophenyl diester, and 4 parts of hexahydroterephthalic acid 4-butylphenyl-4'-fluorophenyl diester.

Inventive Composition 2

92 parts of Basic Composition B, 4 parts of hexahydroterephthalic acid 4-n-propylphenyl-4'-fluorophenyl diester, and 4 parts of hexahydroterephthalic acid 4-n-butylphenyl-4'-fluorophenyl diester.

Inventive Composition 3

92 parts of Basic Composition B, 4 parts of hexahydroterephthalic acid 4-n-propylphenyl-4'-cyanophenyl diester, and 4 parts of hexahydroterephthalic acid 4-butylphenyl-4'-cyanophenyl diester.

Inventive Composition 4

92 parts of Basic Composition B, 4 parts of hexahydroterephthalic acid 4-n-propylphenyl-3'-fluoro-4'-cyanophenyl diester, and 4 parts of hexahydroterephthalic acid 4-butylphenyl-3'-fluoro-4'-cyanophenyl diester.

Results:

TABLE 1

|  | N→I (°C.) | Vth (Vrms) |
| --- | --- | --- |
| Comparative Composition (Basic Composition B) | 61.5 | 1.618 |
| Inventive Composition 1 | 66.5 | 1.610 |
| Inventive Composition 2 | 65.5 | 1.600 |
| Inventive Composition 3 | 71.5 | 1.574 |
| Inventive Composition 4 | 69.5 | 1.560 |

What is claimed is:

1. A transhexahydroterephthalic acid ester derivative represented by the general formula (I):

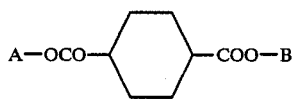

where A is a group of

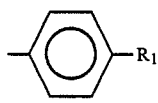

in which $R_1$ denotes alkyl group having 1 to 6 carbon atoms, or a group of

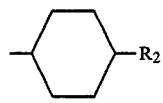

in which $R_2$ denotes an alkyl group having 1 to 6 carbon atoms; B is a group of

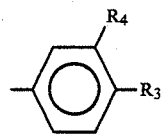

in which $R_3$ denotes a halogen atom, a cyano group, an alkyl group having 1 to 6 carbon atoms or an alkoxy group having 1 to 6 carbon atoms, and $R_4$ denotes a hydrogen atom or a halogen atom, or a group of

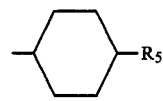

in which $R_5$ denotes an alkyl group having 1 to 6 carbon atoms, except for a case where $R_1$ and $R_3$ are concurrently alkyl groups and $R_4$ is a hydrogen atom.

2. A transhexahydroterephthalic acid ester derivative according to claim 1, wherein A in formula (I) is a group of

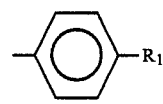

in which $R_1$ has the same meaning as defined above, and B is a group of

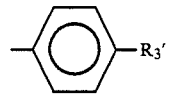

in which $R_3'$ denotes an alkoxy group having 1 to 6 carbon atoms.

* * * * *